Dec. 9, 1969  G. C. MISENER  3,482,914
ADDITIVE COLOR SCENETESTER
Filed Oct. 5, 1967  6 Sheets-Sheet 1
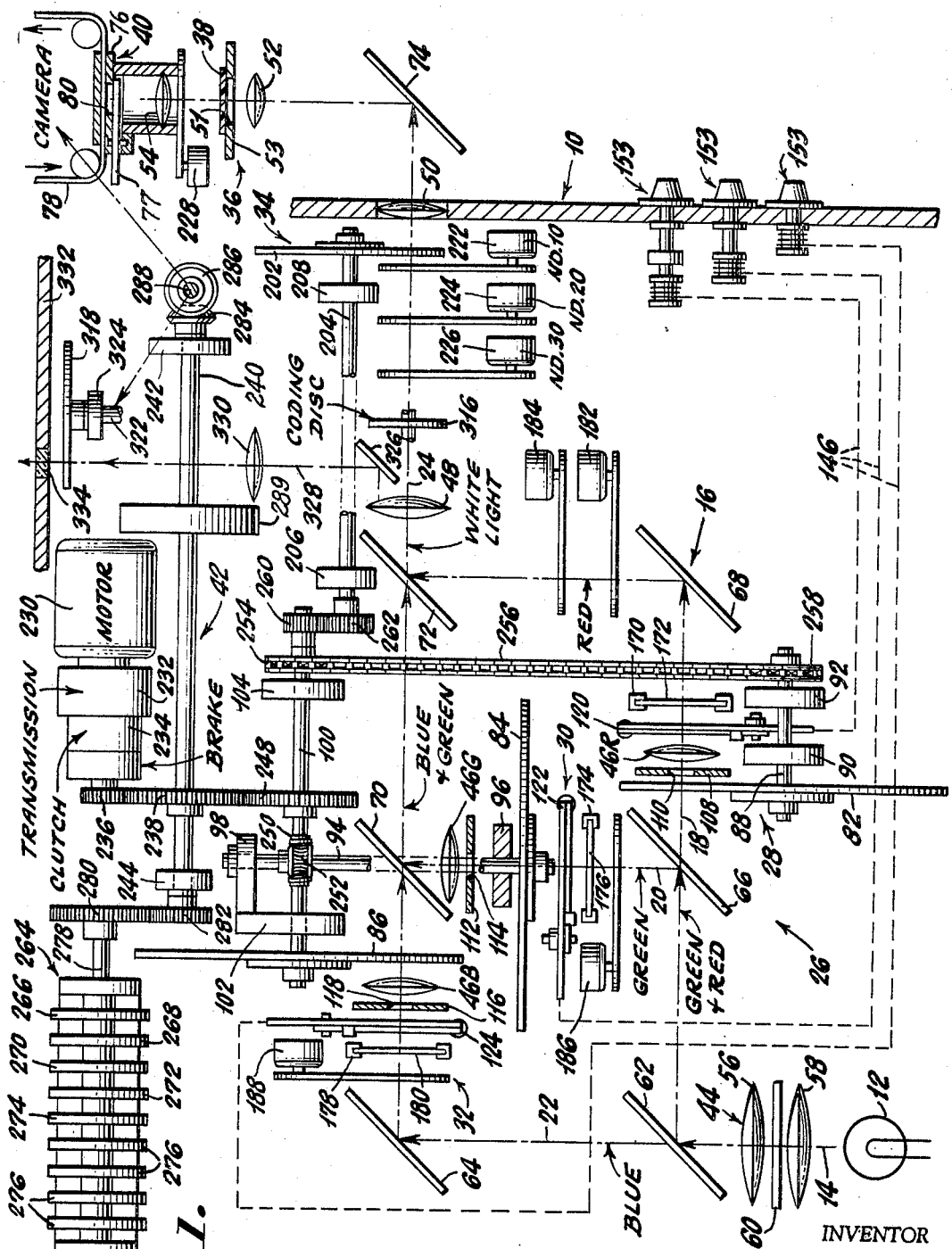
INVENTOR
GARLAND C. MISENER
BY Irons, Birch, Swindler & McKie
ATTORNEYS

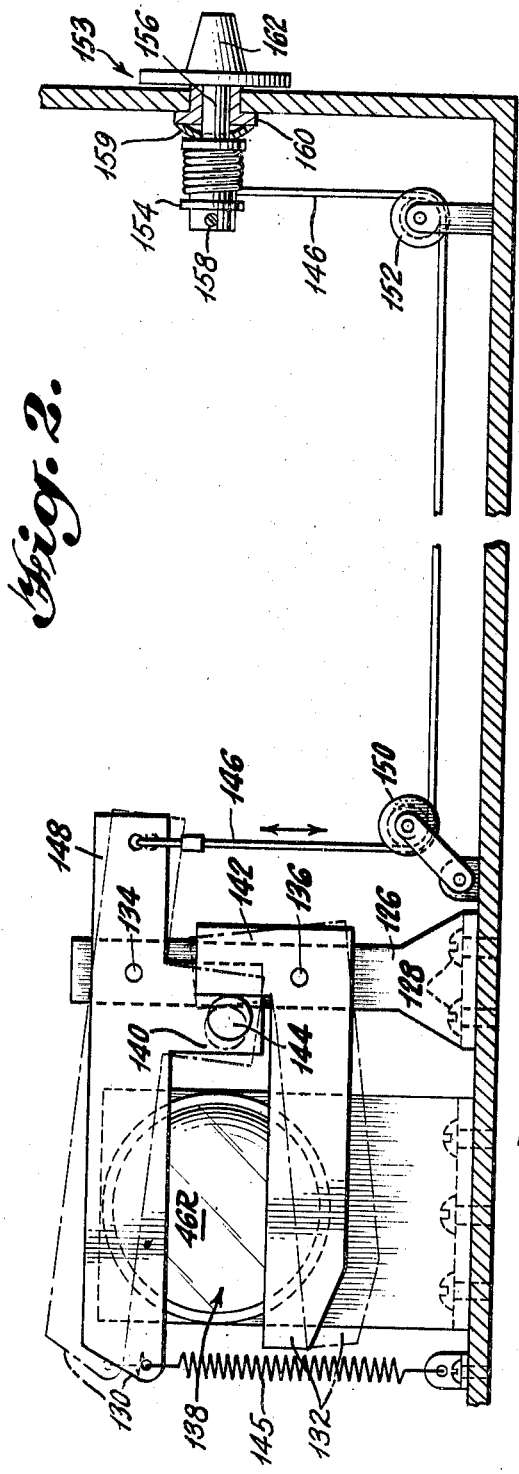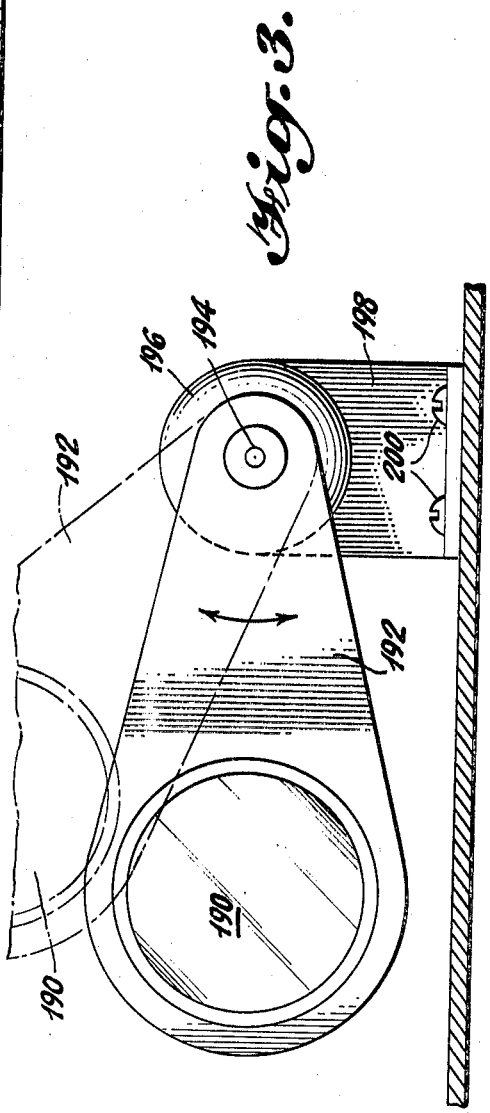

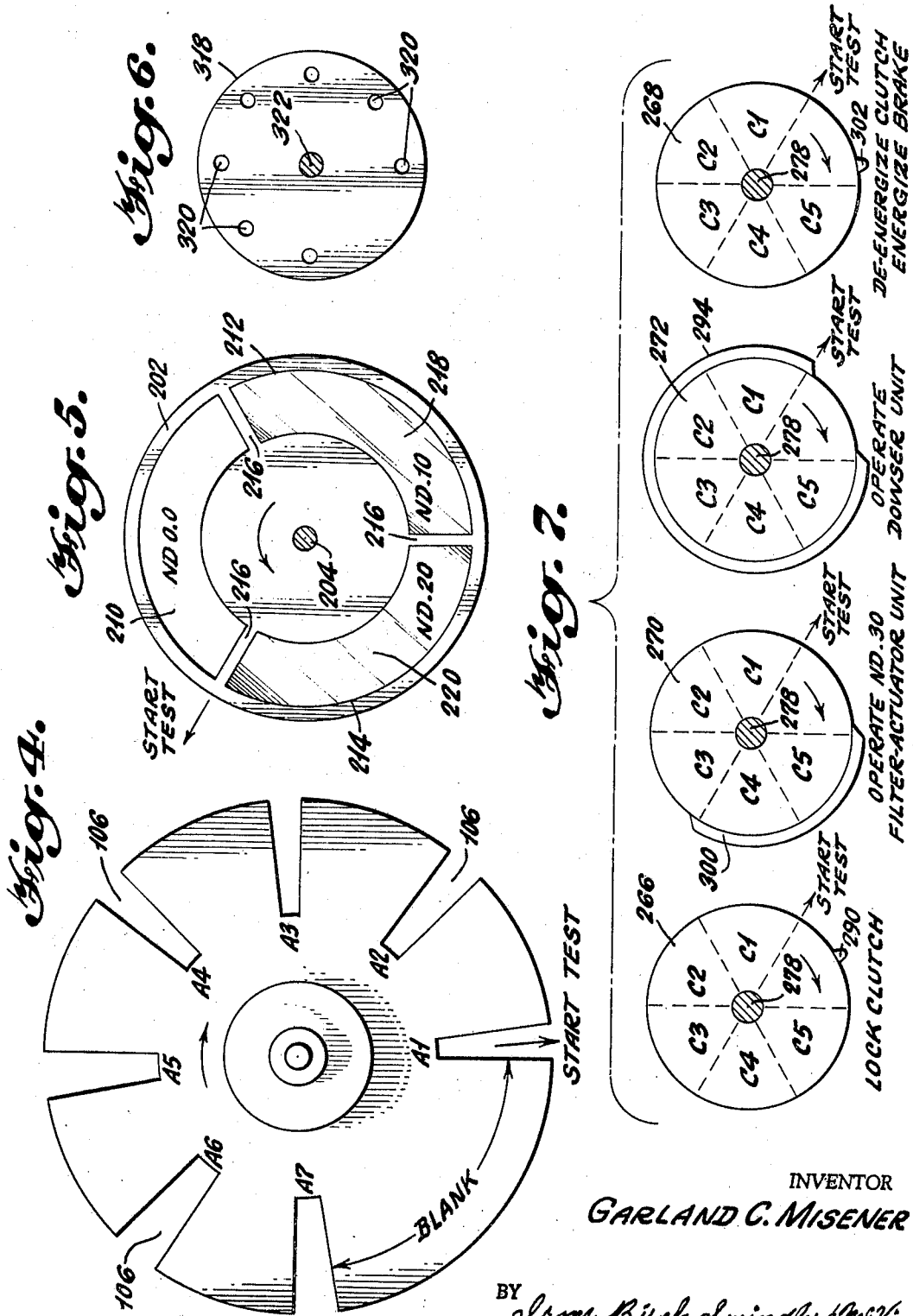

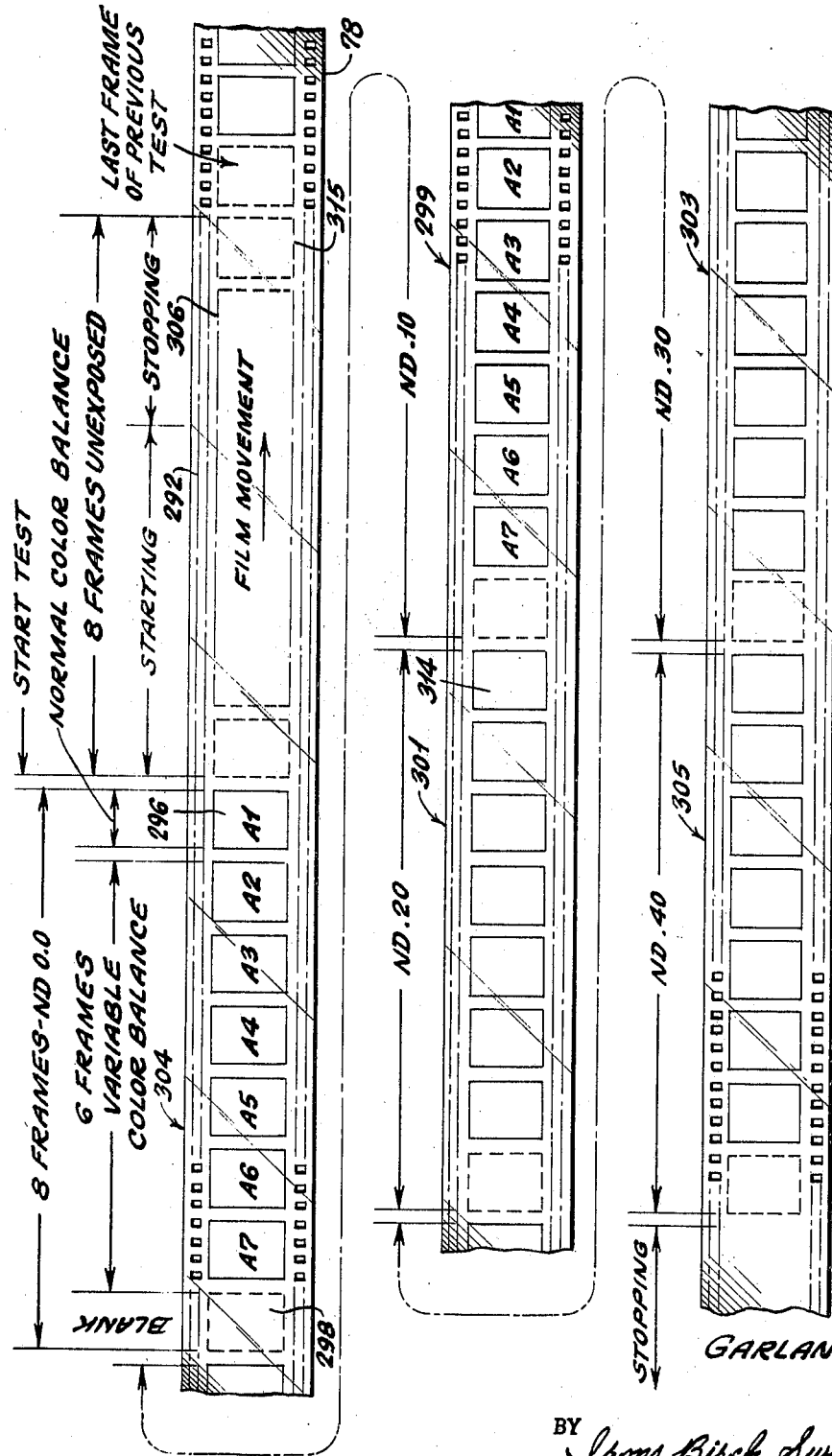

COLOR BALANCE AND DENSITY
DISTRIBUTION OF NORMAL RANGE TEST MODE
SCALE IN 0.025 $LOG_{10}$ E "LIGHT" UNITS

Dec. 9, 1969  G. C. MISENER  3,482,914
ADDITIVE COLOR SCENETESTER
Filed Oct. 3, 1967  6 Sheets-Sheet 6

COLOR BALANCE DISTRIBUTION OF EXTENDED RANGE TEST MODE
SCALE IN 0.025 $LOG_{10}$ E "LIGHT" UNITS

INVENTOR
GARLAND C. MISENER

BY Irons, Birch, Swindler & McKie
ATTORNEYS

United States Patent Office 3,482,914
Patented Dec. 9, 1969

3,482,914
ADDITIVE COLOR SCENETESTER
Garland C. Misener, Potomac, Md., assignor of one-half to Capital Film Laboratories, Inc., Washington, D.C., a corporation of Delaware
Filed Oct. 3, 1967, Ser. No. 672,532
Int. Cl. G03b 27/76, 27/32
U.S. Cl. 355—36                                  26 Claims

ABSTRACT OF THE DISCLOSURE

An apparatus and method for producing photographic images of a translucent film wherein the color balance and density of the images vary in predetermined sequences. A white light beam is split into individual red, green and blue colored light beams and recombined into a white light beam. A means for modulating the individual amounts of colored light present in the recombined beam is provided along with means for operating the modulating means and changing the color balance of the recombined beam in a predetermined sequence. The intensity of the recombined beam is regulated in a predetermined sequence. A translucent film is illuminated with the recombined beam and photographically recorded each time the color balance and/or intensity of the recombined beam is changed.

BACKGROUND OF THE INVENTION

Field of the invention

This invention relates to an apparatus and a process for producing a plurality of photographic test images of a translucent film wherein the color balance and density of the images are varied in predetermined sequences. The test images constitute a strip of photographs from which information concerning the most desirable print color balance and density for the film may be ascertained. The information so obtained serves as a guide for adjusting the exposure controls of a photographic printer so that when a print of the film is made thereon, the print will have the desired color balance and density.

More specifically, the invention concerns an apparatus and a process for photographically printing a strip of test images of a single negative exposure selected from a group of exposures photographically recorded sequentially on motion picture or other types of film. The color balance and density of the test images are varied in predetermined sequences so that by examining the images an operator may determine the most desirable print color balance and density for printing the entire group of exposures. The operator may then adjust, or program the adjustment of, the exposure controls of the photographic printer on which prints of the exposures are to be made so that the printer will produce prints having the desired color balance and density.

The scenetester of the invention is particularly adapted for printing test images of color negatives, and produces a strip of test images having definitive variations of color balance and density substantially throughout the color balance and intensity ranges of the printing beams of commercial photographic color printers. The scenetester also may be employed for printing test images of positive image pre-print films, such as reversal color camera and duplicating films. In particular, the scenetester employs an additive color system which permits an excellent correlation to be achieved between the test images produced thereby and the exposure control scales of commercial additive color printers.

Description of the prior art

Scenetesters or test printers for black and white film have been made which produce test strips of images having image-to-image variations in density. The density variations of the test images produced by such scenetesters may be correlated reasonably accurately with the intensity scale of black and white printers.

However, the prior art devices, while adequate for printing black and white tests, have proved inadequate for printing color tests. Thus, while such devices have been modified by placing various combinations of colored light filters in the path of the printing beam in an effort to produce test strips having variations in color balance as well as density, the tests produced by this subtractive color method have limited ranges of color balance variations, and, due to the inherent spectral deficiencies of the subtractive filters used, have little, if any, direct correlation with the color balance and intensity control scales of additive color printers.

Another problem associated with the color tests produced by the modified prior art scenetesters is that the printing beam and color modulation system of such scenetesters have proved to be inadequate for obtaining good quality tests over the entire ranges of color balance and density desired.

SUMMARY OF THE INVENTION

The scenetester of the present invention overcomes the above-noted deficiencies of the prior art scenetesters by providing means for producing a strip of test images having definitive predetermined image-to-image variations in color balance and predetermined variations in density. The color balance and density variations of the images so produced correspond directly to the calibrations of the exposure control scales of commercial additive color printers so that such printers readily may be adjusted to produce prints having the desired color balance and density.

The scenetester basically comprises: a source of white light, which is generally of the same type as that employed in additive color printers, for producing a white light beam; means for splitting the white light beam into individual red, green and blue colored light beams and recombining the colored beams into a white light beam; means for modulating the individual red, green and blue colored light beams to regulate the amount of colored light present in the recombined beams; means for operating the modulation means and changing the color balance of the recombined beam in a predetermined sequence; means for regulating the intensity of the recombined beam; means for illuminating a translucent film, such as the negative of one frame selected from the scene to be tested, with the recombined beam after the color balance and intensity thereof have been regulated; and means for photographically recording an image of the film each time the color balance of the recombined beam is changed so that a strip of test images is produced having image-to-image variations in color balance which correspond to the modulations of the individual colored light beams and a density which corresponds to the intensity of the recombined beam.

The process of the invention basically comprises: splitting a white light beam into individual red, green and blue colored light beams; modulating the individual colored beams in a predetermined sequence; recombining the colored beams into a white light beam, the color balance of the recombined beam being dependent upon the individual amounts of colored light present therein and changed in correspondence with the modulations of the individual colored beams; regulating the intensity of the recombined beam, illuminating a translucent film with the recombined beam after the intensity thereof has been regulated; and photographically recording an image of the translucent film each time the color balance of the recombined beam is changed so that a strip of test images is produced having image-to-image variations in color balance which correspond to the modulations of the individual colored beams and a density which corresponds to the intensity of the recombined beam.

The white light beam is split into the basic red, green and blue colored light beams and the colored beams recombined into a white light beam by a dichroic mirror system.

In addition to the definitive color balance and density variations and ranges of such variations obtainable with the apparatus of the invention, one of the principal advantages of the scenetester is that it may be operated in a white light environment. White light operation minimizes the possibility that the negative being tested will be damaged inadvertently by the operator, as frequently occurs in dark room operations.

Further, the scenetester of the invention includes means for coding the test images produced thereby so that the intensity and/or color balance of the printing beam used for producing the images conveniently may be ascertained by anyone examining the images.

In light of the foregoing observations and description, it is an object of the present invention to provide a scenetester or test printer which will produce a strip of photographic test images having variations in color balance and density which may be directly correlated with the calibrations of the exposure control scales of additive color printers.

It is another object of the invention to provide an additive color scenetester which splits a white light beam into individual red, green and blue colored light beams, modulates each of the colored beams in a predetermined sequence and recombines the colored beams into a white light beam.

It is a further object of the invention to provide an additive color scenetester in which the intensity of the printing beam is varied in a predetermined sequence.

It is an additional object of the invention to provide a scenetester which may be operated in a white light environment.

It is also an object of the invention to provide a scenetester which produces a strip of test images having coding information thereon indicating the intensity and/or color balance of the printing beam.

With the foregoing summary of the invention in mind, a preferred embodiment thereof is described below in connection with the following drawings.

BRIEF DESCRIPTION OF THE DRAWINGS

FIG. 1 is a diagrammatic view of the scenetester of the invention;

FIG. 2 is an elevational view of one of the colored light beam trimmers employed in the scenetester shown in FIG. 1;

FIG. 3 is an elevational view of one of the filter-actuator units employed in the scenetester shown in FIG. 1;

FIG. 4 is an elevational view of one of the colored light beam modulator wheels employed in the scenetester shown in FIG. 1;

FIG. 5 is an elevational view of the intensity regulator wheel employed in the scenetester shown in FIG. 1;

FIG. 6 is a plan view of the apertured wheel of the indicating means employed in the scenetester shown in FIG. 1;

FIG. 7 is an elevational view of four of the rotary switching cams employed in the scenetester shown in FIG. 1;

FIG. 8 is a diagrammatic view of the test images produced by the scenetester shown in FIG. 1;

DESCRIPTION OF THE PREFERRED EMBODIMENT

General arrangement

Figure 9:
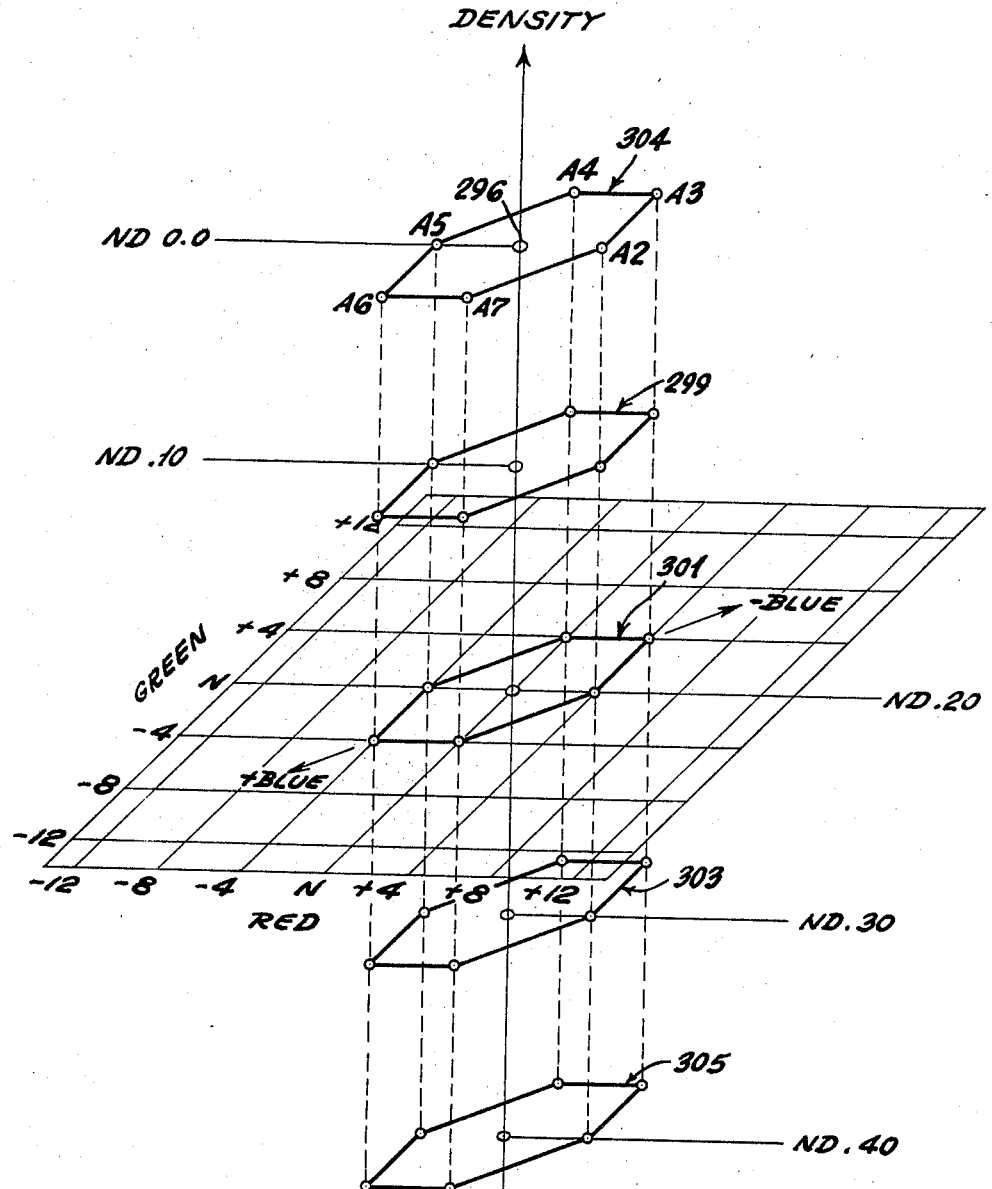
FIG. 9 is a graphic illustration of the color balance and density distribution of the test images produced by the scenetester shown in FIG. 1 when operated in the normal range test mode.

A preferred embodiment of the apparatus of the invention is shown in FIG. 1 comprising scenetester 10. Scenetester 10 includes a source of white light, lamp 12, which may be the same type of light source as that employed in commercial additive color printers. Lamp 12 produces a white light beam 14.

A dichroic mirror system 16 splits beam 14 into individual red, green and blue colored light beams 18, 20 and 22, respectively, and recombines the colored beams into a white light beam 24. Beam 24 constitutes the printing beam of scenetester 10.

A modulating means 26, which includes individual modulating groups 28, 30 and 32 positioned in the paths of colored beams 18, 20 and 22, respectively, modulates the colored beams individually to regulate the amounts of red, green and blue colored light present in recombined beam 24. Modulating groups 28, 30 and 32 are operated cyclically in synchronism with each other by an operating means 42. As a result of the cyclical synchronous operation of the modulating groups, the color balance of beam 24 is changed repetitiously in a predetermined sequence.

The intensity of beam 24 is regulated by a regulating means 34 which also is connected to operating means 42 and is operated thereby in synchronism with modulating means 26.

After the color balance and intensity of beam 24 have been regulated, an illuminating means 36 directs the beam through a translucent film 38, comprising one negative frame of a scene recorded on motion picture film. The image of film 38 produced by beam 24 is projected to a photographic recording means 40 which records an image of the film each time the color balance of the beam is changed by modulating means 26.

As will be apparent from this brief description, scenetester 10 produces a strip of photographic test images of film 38 which has image-to-image variations in color balance and predetermined variations in density corresponding to the changes in color balance and intensity of printing beam 24.

DETAILED DESCRIPTION

The optical system

The optical system employed in scenetester 10 is shown in FIG. 1 and comprises three serially arranged condenser-objective projection functions which are combined with dichroic mirror system 16. The first projection function comprises a condenser 44 and objectives 46R, 46G and 46B; the second function comprises a condenser 48 and an objective 50; and the third function comprises a condenser 52 and an objective 54. Dichroic mirror system 16 is interposed between condensers 44 and 48 for splitting white light beam 14 into colored light beams 18, 20 and 22 and recombining the colored beams into white light printing beam 24.

Condenser 44, comprising two lenses 56 and 58 and a plate of heat-absorbing glass 60, is positioned adjacent lamp 12 for directing beam 14 onto a first dichroic mirror 62. Mirror 62 reflects all of the light impinging thereon except blue light which passes therethrough as beam 22. A first aluminized mirror 64 reflects beam 22 into objective 46B where a blue image of the filament of lamp 12 is formed by condenser 44.

The light reflected by mirror 62 is directed onto a second dichroic mirror 66. Mirror 66 reflects all of the light impinging thereon except red light which passes therethrough as beam 18. From mirror 66, beam 18 passes into objective 46R, where a red image of the lamp filament is formed by condenser 44, and onto a second aluminized mirror 68.

After blue beam 22 and red beam 18 have been separated from white beam 14 by dichroic mirrors 62 and 66, the only component of beam 14 remaining constitutes green light, which is reflected from mirror 66 as beam 20. Mirror 66 directs beam 20 into objective 46G where a green image of the lamp filament is formed by condenser 44.

After the colored beams are modulated by their respective modulating groups, as described below, they are recombined into white light beam 24. The recombining or "adding" of beams 18, 20 and 22 is performed by third and fourth dichroic mirrors 70 and 72.

Blue beam 22, after being modulated by modulating group 32, impinges on dichroic mirror 70, which permits only blue light to pass therethrough. Green beam 20, after being modulated by group 30, impinges on and is reflected by mirror 70; and is recombined by the mirror with blue beam 22, which passes therethrough. The recombined blue and green beam thereafter impinges on dichroic mirror 72, which permits all light except red light to pass therethrough.

Red beam 18 is modulated by group 28 and reflected by aluminized mirror 68 toward dichroic mirror 72. Beam 18 impinges on and is reflected by mirror 72; and is recombined by the mirror with the recombined blue and green beam, which passes therethrough, to form recombined white light beam 24.

Dichroic mirror 72 directs beam 24 into secondary condenser 48 where objectives 46R, 46G and 46B form superimposed red, green and blue images of condenser 44. Condenser 48 relays beam 24 to field objective lens 50, forming an image of the lamp filament therein. As the beam passes between condenser 48 and objective 50, the intensity thereof is regulated by regulating means 34, as described below.

After passing through objective 50, beam 24 is reflected by a mirror 74 into condenser 52. Objective 50 forms images of condensers 44 and 48 in condenser 52 which uniformly illuminate an aperture 51 formed in a mounting plate 53. Film 38 is placed on plate 53 over aperture 51 for illumination by the printing beam after it passes through aperture 51.

The projection functions are completed by condenser 52 and printing objective 54; the former relaying the lamp filament image to the latter, and the latter forming an image of film 38 at recording means 40.

The recording means

Recording means 40 comprises a motion picture camera 76 including a shutter 77 and a framing aperture 80. Sequentially exposed at aperture 80 are the frames of a strip of printing film 78. The focal length of printing objective 54 is selected to provide a sharp image of film 38 at aperture 80 where the image impinges on the printing film.

Camera 76 is driven by operating means 42 in synchronism with modulating groups 28, 30 and 32 so that one frame of printing film 78 will be exposed at aperture 80 each time the color balance of beam 24 is changed.

The modulating means

The basic elements of modulating groups 28, 30 and 32 are color modulator wheels 82, 84 and 86, respectively. Wheel 82 is affixed to a shaft 88 which is rotatably supported by bearing blocks 90 and 92. Similarly, wheel 84 is affixed to a shaft 94 which is rotatably supported by bearing blocks 96 and 98. And, wheel 86 is affixed to a shaft 100 which is rotatably supported by bearing blocks 102 and 104.

An elevational view of one of the modulator wheels is shown in FIG. 4. Each wheel has seven apertures 106 formed therein, designated A1–A7 beginning with the bottommost aperture as seen in FIG. 4 and moving counter-clockwise around the wheel to the left-hand side thereof. The radial centerline of each aperture is angularly displaced substantially 45° from the centerline of the adjacent apertures, with the exception of the centerlines of apertures A1 and A7 which are separated by an arc of substantially 90° for a purpose described below.

As will be seen in FIG. 1, the edges of wheels 82, 84 and 86 are positioned in the paths of beams 18, 20 and 22, respectively. Thus, when the wheels are rotated apertures 106 will move sequentially into and out of the paths of the beams. The wheels are rotated in synchronism with each other by operating means 42 so that when aperture A1 of wheel 82 is positioned in the path of red beam 18, apertures A1 of wheels 84 and 86 will be positioned in the paths of green and blue beams 20 and 22, respectively. As will be apparent, the color balance of recombined printing beam 24, at any particular time, is determined by the individual amounts of colored light admitted through the corresponding apertures in the wheels which, at that time, are positioned in the paths of the colored beams.

In order to achieve the desired variations in the color balance of beam 24, the apertures in each wheel are of varied sizes, as seen in FIG. 4, and the sequence of aperture sizes for apertures A2–A7 is different for each wheel. Thus, as the wheels rotate in synchronism with each other, the color balance of beam 24 will be changed in a predetermined sequence as a function of the sequential differences of aperture sizes for the wheels. During each rotation of the modulator wheels the color balance of beam 24 will be changed each time the corresponding apertures in the wheels move into the paths of the colored beams.

In order to provide a color balance reference for each rotation of the wheels, aperture A1 is of substantially the same size for each of the wheels. Thus, the first color balance variant of beam 24 for each revolution of the wheels will be composed of equal amounts of red, green and blue light, constituting a normal color balance.

To facilitate the presentation of an example of the color balance variations of beam 24 which may be produced by modulator wheels 82, 84 and 86, the "light" unit may be utilized, a term which is well known in the motion picture industry. Most commercial additive color printers have automatic, program-controlled aperture systems for producing scene-to-scene changes in the intensity of the individual red, green and blue colored light beam components which are "added" together to form the printing beam. Such printers also frequently include manually regulated "trimmer" adjustments in the aperture systems to provide further control over the intensity of the component beams. The range of intensity adjustment for each component beam is divided into a scale of "lights," representing uniform steps of the logarithm to the base ten of exposure. Exposure, E, is defined as the product of intensity, I, and time, T, i.e., $E=IT$, and is usually expressed in meter candle-second or foot candle-second units.

The intensity scales of most commercial additive color printers are calibrated in $\log_{10} E$ steps of .025, i.e., 1 "light"=a $\log_{10} E$ change of .025. On this scale, a 12 "light" increment or decrement represents a $\log_{10} E$ change of .300, equivalent to an exposure factor of two, or one "stop" with a conventional camera aperture. One commercial additive color printer now widely used has an automatic, program-controlled range of 50 "light" settings at $\log_{10} E$ intervals of .025, plus a "trimmer" range of 22 "lights" for each of the three colored light beam components of the printing beam.

One example of a useful range of variations in the color balance of beam 24 is illustrated in Table I, below.

TABLE I

A1. Normal
A2. +4 Red
A3. −4 Blue
A4. +4 Green
A5. −4 Red
A6. +4 Blue
A7. −4 Green The first color balance variant shown in the table is the normal balance produced when the corresponding apertures A1 synchronously move into the paths of the colored beams. The color balances of the other variants are indicated by the differences from the normal balance, in "light" values for each color, produced by the sequential movement of corresponding apertures A2–A7 into the beam paths. As the table illustrates, each rotation of the modulator wheels causes the color balance of printing beam 24 to change sequentially seven times beginning with the normal balance followed by six color balance variants.

As previously mentioned, each time the color balance of beam 24 is changed by wheels 82, 84 and 86, a different frame of printing film 78 is exposed at aperture 80. Thus, an image of film 38 is recorded each time the color balance of printing beam 24 is changed.

In addition to a modulator wheel, each modulating group includes a limiting aperture and an adjustable light beam trimmer. The limiting apertures are formed in plates positioned adjacent objectives 46R, 46G and 46B in the paths of beams 18, 20 and 22, respectively. Thus, a plate 108 having a limiting aperture 110 therein is positioned adjacent objective 46R; a plate 112 having a limiting aperture 114 therein is positioned adjacent objective 46G; and a plate 116 having a limiting aperture 118 therein is positioned adjacent objective 46B. Apertures 110, 114 and 118 are of a fixed size and function to limit the time during which the beams will be transmitted to camera 76 while successive apertures 106 in the modulator wheels are in the beam paths. The size of apertures 110, 114 and 118 is selected so that light will be transmitted to camera 76 only during the time shutter 77 is open.

The adjustable light beam trimmers also are positioned near objectives 46R, 46G and 46B in the paths of beams 18, 20 and 22, respectively. Thus, a trimmer 120 is positioned in the path of red beam 18; a trimmer 122 is positioned in the path of green beam 20; and a trimmer 124 is positioned in the path of blue beam 22.

The structural details of one of the trimmers are shown in FIG. 2. Each trimmer includes a vertical supporting member 126 which is attached to the frame of scenetester 10 by bolts or similar fasteners 128. A pair of substantially horizontally disposed trimmer blades 130 and 132 are pivotally connected to support member 126 by pivot pins 134 and 136, respectively. Blades 130 and 132 are substantially vertically aligned with each other to define therebetween a variable-sized opening 138 through which one of the colored beams passes.

A substantially vertical leg is integrally affixed to each of the blades; leg 140 being affixed to upper blade 130 and leg 142 being affixed to lower blade 132. As shown in FIG. 2, leg 140 extends downwardly from blade 130 and leg 142 extends upwardly from blade 132, with a portion of leg 140 horizontally overlapping a portion of leg 142. The overlapping portion of leg 140 is positioned adjacent the overlapped portion of leg 142 and between the overlapped portion of the latter leg and opening 138.

Affixed to the overlapping portion of leg 140 is a resilient bearing 144 which is abutted by the overlapped portion of leg 142. Bearing 144 may be composed of nylon or a similar material.

When blade 130 is pivoted upwardly, as shown in phantom lines in FIG. 2, leg 140 will move inwardly toward opening 138. As leg 140 moves inwardly, the gravitational force acting on blade 132 will cause that blade to pivot downwardly and leg 142 will continue to abut bearing 144, so that lower blade 132 will move downwardly an amount equal to the upward movement of upper blade 130. Conversely, when blade 130 is pivoted downwardly, a similar coaction between legs 140 and 142 will occur, causing blade 132 to pivot upwardly against the gravitational force acting thereon.

An adjusting means is provided for adjusting the positions of blades 130 and 132, and thus regulating the size of opening 138. The adjusting means includes a flexible cable 146 having one end affixed to a lateral extension 148 of upper blade 130, and extending from the blade extension to the front panel of scenetester 10. Suitable pulleys 150 and 152 attached to the frame of the scenetester are provided for guiding the cable.

The other end of cable 146 is secured to a control unit 153 mounted on the front panel of the scenetester. Control unit 153 comprises a cable storage pulley 154 on which cable 146 is taken up and let out; a shaft 156 having pulley 154 secured to one end thereof by a set screw 158; a spring or friction washer 159; a bushing 160 mounted in the front panel of the scenetester and journalling shaft 156; and a control knob 162 affixed to the other end of shaft 156. As will be apparent, by manipulating knob 162 an operator may control the size of opening 138 by adjusting the positions of blades 130 and 132.

A small biassing spring 145 is connected between the outer extremity of upper blade 130 and the frame of scenetester 10, insuring that the upper blade maintains a tensioning force on cable 146 to keep the cable taut.

A flexible cable 146 and control unit 153 are provided for each of trimmers 120, 122 and 124. The trimmers provide a means for individually adjusting the size of beams 18, 20 and 22 with essentially no vignetting or wedging of beam 24 at aperture 51.

Modulating groups 28, 30 and 32 also each include a filter holder for positioning a fixed-value light filter in the path of each of the colored beams. Modulating group 28 includes a holder 170 for positioning a filter 172 in the path of red beam 18; group 30 includes a holder 174 for positioning a filter 176 in the path of green beam 20; and group 32 includes a holder 178 for positioning a filter 180 in the path of blue beam 22. Filters 172, 176 and 180 are neutral density filters which compensate for any differences in the intensity of the colored beams generated by a particular lamp 12, thus insuring that the basic intensity of all of the colored beams are equal.

In addition to fixed-position filters 172, 176 and 180, the modulating groups include means for automatically interposing one or more light filters in the paths of the colored beams. Such means comprise a plurality of filter-actuator units 182, 184, 186 and 188.

One of the filter-actuator units is shown in FIG. 3 and includes a light filter 190 which is mounted in an arm 192. Arm 192 is affixed to the shaft 194 of a rotary solenoid 196. The solenoid is held in place by a mounting bracket 198 which is attached to the frame of scenetester 10 by bolts or similar fasteners 200.

When solenoid 196 is actuated, shaft 194 and arm 192 affixed thereto are pivoted downwardly, as seen in FIG. 3, to interpose filter 190 in the path of one of the colored light beams. When the solenoid is de-energized, shaft 194 and arm 192 are pivoted upwardly, as seen in phantom lines in FIG. 3, by the return spring within solenoid 196 to remove filter 190 from the path of the beam.

The filters 190 of units 182, 184, 186 and 188 are neutral density filters and are employed for producing an extended range color balance test, as described below.

The regulating means

Regulating means 34 which regulates the intensity of recombined beam 24 includes a regulator wheel 202 which is secured to a shaft 204 journalled in bearing supports 206 and 208. An elevational view of wheel 202 is shown in FIG. 5. The wheel has three sectored apertures 210, 212 and 214 therein. The apertures each encompass an arc of approximately 120° and are separated by spokes 216. A neutral density filter 218 is mounted in aperture 212 and another neutral density filter 220 is mounted in aperture 214. Aperture 210 is open having no filter mounted therein.

As shown in FIG. 1, the edge of wheel 202 is positioned in the path of beam 24 so that as the wheel is rotated the apertures will move sequentially into and out of the beam path. The intensity of the beam will be unaltered by the regulator wheel when aperture 210 is rotated into the beam path since that aperture is open. However, when apertures 212 and 214 are sequentially rotated into the beam path the intensity of the beam will be diminished by the filters carried thereby.

Filters 218 and 220 are of different values so that the intensity of beam 24 will be diminished by a different amount for each filter. An example of the filters which may be utilized for producing a test having a useful range of density variations is shown in Table II, below.

TABLE II

Neutral density filter 218: ND.10=−4 "lights"
Neutral density filter 220: ND.20=−8 "lights"

As is well known, density, D, is equal to the logarithm to the base ten of the reciprocal of transmission factor, T, i.e., $$D = \log_{10} \frac{I}{T}$$

As will be apparent, the intensity of beam 24 is changed sequentially three times for each revolution of wheel 202. When open aperture 210 is moved into the path of the beam the intensity thereof will be unaltered; when aperture 212 carrying filter 218 is moved into the path of the beam the intensity thereof will be reduced by four "lights"; and when aperture 214 carrying filter 220 is moved into the path of the beam the intensity thereof will be reduced by eight "lights."

Wheel 202 is rotated by operating means 42 in synchronism with the rotation of modulator wheels 82, 84 and 86. However, the rotational speed of the regulator wheel is one-third the rotational speed of the modulator wheels. Thus, for each 120° of rotation of the regulator wheel, the modulator wheels will rotate a complete revolution so that one complete sequence of color balance variations will occur as each of apertures 210, 212 and 214 pass through beam 24. Hence, for each change in the intensity of the beam one complete color balance cycle will be completed.

Also included in regulating means 34 are a plurality of filter-actuator units 222, 224 and 226. Units 222, 224 and 226 are identical to units 182, 184, 186 and 188 as described above in connection with FIG. 3. The filters carried by arms 192 of units 222, 224 and 226 are neutral density filters which may be of the values shown in Table III, below.

TABLE III

Unit 222: ND.10=−4 "lights"
Unit 224: ND.20=−8 "lights"
Unit 226: ND.30=−12 "lights"

Unit 226 is operated in synchronism with the rotation of wheel 202. After wheel 202 has completed one revolution and aperture 210 moves into the path of beam 24 at the beginning of the second revolution of the wheel, unit 226 is energized to interpose the ND.30 filter in the path of beam 24. During the second revolution of wheel 202 the intensity of beam 24 will be diminished by the sum of the neutral density filters carried by unit 226 and wheel 202.

Unit 222 is employed for producing the extended range color balance test described below, and unit 224 may be energized manually by a push-button (not shown) located on the front panel of scenetester 10 for producing tests of scenes having unusually high image density.

The illuminating means

The means for illuminating film 38 includes objective 50, mirror 74, condenser 52, and plate 53 having aperture 51 therein. In addition, the illuminating means includes a dowser unit 228. Unit 228 is similar to the filter-actuator units described above except that in place of the translucent neutral density filter carried by the arms of the filter-actuator units, the arm of dowser unit 228 carries an opaque flag. As seen in FIG. 1, the flag may be interposed in the path of beam 24 between film 38 and recording means 40 to prevent extraneous exposure of the film 78 in camera 76.

At the beginning of each test, unit 228 is energized to move the flag out of the path of beam 24 so that images of film 38 will be recorded on printing film 78. At the end of each test the unit is de-energized to move the flag back into the path of the beam for preventing extraneous exposure of the printing film.

The operating means

As mentioned above, modulator wheels 82, 84 and 86, regulator wheel 202, filter-actuator units 182, 184, 186, 188, 222 and 226, dowser unit 228 and camera 76 are all operated synchronously by operating means 42.

The means for driving the modulator wheels includes an electric motor 230 having its output shaft connected to a transmission 232 which in turn is drivingly connected to an electric clutch and brake mechanism 234. Affixed to the output shaft of mechanism 234 is a gear 236. Gear 236 meshes with a gear 238 which is affixed to a shaft 240 rotatably supported in bearing blocks 242 and 244. Gear 238 meshes with gear 248 affixed to shaft 100 on which modulator wheel 86 is secured. Also affixed to shaft 100 is a helical gear 250 which meshes with another helical gear 252; the latter gear being affixed to shaft 94 on which modulator wheel 84 is secured. A sprocket 254 is also secured to shaft 100 and has one end of a drive chain 256 trained thereabout. The other end of drive chain 256 is trained about a sprocket 258 which is affixed to shaft 88 on which modulator wheel 82 is secured.

From the above description, it will be apparent that when gear 236 is rotated by the output shaft of mechanism 234, rotary movement will be imparted through the various gears, shafts, sprockets and chain to modulator wheels 82, 84 and 86. The driving components are selected so that the modulator wheels will rotate in synchronism with each other at the same speed.

The means for driving the regulator wheel includes a gear 260 which is affixed to shaft 100 for rotation with the shaft when the modulator wheels are rotated. Gear 260 meshes with a gear 262 which is affixed to shaft 204 on which regulator wheel 202 is secured. Gears 260 and 262 are selected so that wheel 202 will rotate in synchronism with, but at one-third the rotary speed of, wheels 82, 84 and 86.

The means for energizing clutch and brake mechanism 234, the solenoids of filter-actuator units 182, 184, 186, 188, 222 and 226, and the solenoid of dowser unit 228 comprises a programming unit 264. Unit 264 includes a plurality of microswitches (not shown) and cooperating rotary switching cams for actuating the switches. Specifically, unit 264 includes a pair of cams 266 and 268 and cooperating microswitches for energizing and de-energizing, respectively, the clutch of mechanism 234; a cam 270 and cooperating microswitch for energizing filter-actuator unit 226 when the scenetester is employed for producing a normal range color balance test; a cam 272 and cooperating microswitch for energizing dowser unit 228; a cam 274 and cooperating microswitch for energizing filter-actuator unit 222 when the scenetester is employed for producing an extended range color balance test; and four cams 276 and cooperating microswitches for energizing filter-actuator units 182, 184, 186 and 188 when the scenetester is employed for producing an extended range color balance test.

All of the cams are affixed to a shaft 278 which has a gear 280 secured to one end thereof. Gear 280 meshes with a gear 282 which is affixed to shaft 240 so that when the modulator and regulator wheels are rotated the cams of unit 264 will be rotated also. However, gears 280 and 282 are selected so that the cams will rotate at one-sixth the rotary speed of the modulator wheels and at one-half the rotary speed of the regulator wheel. As described below, one complete test is produced during each revolution of the cams.

The means for driving camera 76 includes shaft 240 and a bevel gear 284 affixed to one end thereof. Gear 284 meshes with another bevel gear 286 which is secured to a shaft 288.

Shaft 288 is drivingly connected to the internal driving elements (not shown) of camera 76 as indicated schematically in FIG. 1. Gears 284 and 286 are selected so that each time the color balance of beam 24 is changed by modulator wheels 82, 84 and 86, a different frame of printing film 76 will be exposed at aperture 80.

A flywheel 289 is affixed to shaft 240 to reduce the acceleration imparted to the various driven elements of operating means 42 by motor 230, providing a desirable "soft" start.

The normal range color balance test

Prior to the commencement of either the normal or extended range color balance test, lamp 12 and motor 230 are energized. To initiate the normal range test, a pushbutton (not shown) on the front panel of scenetester 10 is depressed to apply a holding voltage to the clutch and de-energize the brake of mechanism 234. The clutch is not completely locked against internal slippage by the holding voltage, but does transmit a starting torque to the driven elements of the scenetester.

The starting torque overcomes the inertia of modulator wheels 82, 84 and 86, regulator wheel 202, flywheel 289, and the internal driving elements of camera 76, causing these elements to quickly reach their operating speeds. Also, the switching cams of programming unit 264 begin to rotate synchronously with the movement of the other driven elements of the scenetester.

After cam 266 has rotated a few degrees, a detent 290 thereon contacts the cooperating microswitch. Actuation of the switch applies locking voltage to the clutch so that the torque developed at the output of transmission 232 will be transmitted through the clutch to the moving elements of the scenetester. At this time, all of the driven elements of the scenetester will be moving at their designed operational speeds.

While the driven elements of the scenetester are reaching their operational speeds, a few frames of printing film 78 will move past aperture 80. These starting frames, designated by the numeral 292 in FIG. 8, will be unexposed since during the starting period the flag carried by dowser unit 228 is positioned in the path of printing beam 24.

After locking voltage has been applied to the clutch of mechanism 234, a raised portion 294 of cam 272 contacts the cooperating microswitch. Actuation of the switch energizes the solenoid of dowser unit 228 which then moves the opaque flag carried by the unit out of the path of the printing beam. At this time, images of film 38 will begin to be recorded on printing film 78.

As shown in FIG. 7, raised portion 294 extends around substantially five-sixths of the circumference of cam 272. Thus, the solenoid of dowser unit 228 will remain energized during the time required for cam 272 to complete five-sixths of a revolution.

When the flag carried by the dowser unit is moved out of the path of the printing beam, apertures A1 in the modulator wheels will be positioned in the paths of colored light beams 18, 20 and 22. Also, at this time, the left portion of open aperture 210 in regulator wheel 202, as seen in FIG. 5, will be positioned in the path of recombined beam 24. This combination of color balance and intensity will produce the first frame of the normal range test recorded on printing film 78, as designated by the numeral 296 in FIG. 8.

As the test continues, succeeding apertures A2–A7 in the modulator wheels will rotate synchronously through the paths of the colored beams while aperture 210 in the regulator wheel, which moves at one-third the rotary speed of the modulator wheels, rotates through the path of the recombined beam. Thus, a series 304 of seven frames will be recorded before aperture 210 moves out of the path of beam 24. Each of the seven frames will have a different color balance beginning with an equal or normal color balance followed by the six color balance variants indicated in Table I.

As apertures A7 in the modulator wheels rotate out of the paths of the colored beams and the blank portions of the modulator wheels between apertures A7 and A1 move into the beam paths, the spoke 216 in the regulator wheel between apertures 210 and 212 will move into the path of the recombined beam. Simultaneously, a frame 298 will be exposed at aperture 80 on which no image of film 38 will be recorded since the blank portions of the modulator wheels interrupt the passage of light to the film. Frame 298 constitutes a transition frame between each color balance cycle produced by the modulator wheels and each intensity change of the recombined beam produced by the regulator wheel.

As apertures A1 rotate back into the path of the colored beams at the beginning of the second revolution of the modulator wheels, the upper portion of aperture 212 in the regulator wheel, as seen in FIG. 5, will rotate into the path of the recombined beam. Thereafter, a second series 299 of seven images of film 38 will be recorded on the next seven frames of printing film 78. The image-to-image color balance variations of second series 299 will be the same as the color balance variations of first series 304, but all of the images of series 299 will have a density corresponding to that produced by the ND.10 filter 218 in aperture 212 instead of a density corresponding to that produced by open aperture 210.

A third series 301 of seven images will be recorded when the ND.20 filter 220 in aperture 214 of the regulator wheel moves into the path of the recombined beam.

As aperture 214 moves out of the path of beam 24 after third series 301 has been recorded, a raised portion 300 on cam 270 will contact the cooperating microswitch. Actuation of that switch energizes the solenoid of filter-actuator unit 226 and the ND.30 filter carried thereby will be interposed in the path of the printing beam. As seen in FIG. 7, raised portion 300 extends around substantially one-third of the circumference of cam 270, thus the ND.30 filter will remain in the path of the printing beam as open aperture 210 and aperture 212 having the ND.10 filter 218 therein rotate through the path of the printing beam. The intensity of beam 24 during this portion of the test will be diminished by the sum of the filters carried by unit 226 and wheel 202. Thus, while aperture 210 is in the beam path the intensity thereof will be reduced by 12 "lights" and while aperture 212 is in the beam path the intensity thereof will be reduced by 16 "lights," and the fourth and fifth series 303 and 305 of images recorded on film 78 will have densities corresponding to the combined ND.30 and ND.40 filter values of unit 226 and wheel 202.

Each series of seven images recorded during each color balance cycle conveniently may be referred to as a color "ring." The normal range test is completed after the fifth color "ring" or series 305 of images has been recorded.

After series 305 has been recorded, raised portion 294 on cam 272 will rotate out of contact with the cooperating microswitch and the opaque flag carried by dowser unit 228 will be moved back into the path of beam 24. Also, raised portion 300 on cam 270 will rotate out of contact with the cooperating microswitch and the ND.30 filter carried by unit 226 will be moved out of the path of the printing beam.

Thereafter, a detent 302 on cam 268 closes the cooperating microswitch causing the clutch and brake of mechanism 234 to be de-energized and energized, respectively, and the moving elements of the scenetester are quickly stopped.

After the opaque flag carried by dowser unit 228 moves into the path of the printing beam upon completion of the test, a few frames, designated 306 in FIG. 8, will move past aperture 80 while the moving elements of the scenetester are stopped. Frames 306, similarly to frames 292, will be unexposed and provide with frames 292 of the next succeeding test, a transition indicator between tests.

The transition indicator comprises eight unexposed frames, being the sum of frames 292 and 306. Thus, for each test forty-eight frames of printing film 78 are consumed which constitute the eight unexposed frames for starting and stopping the moving elements of the scenetester, and the five series of eight frames each comprising the five color "rings." As will be apparent, for each eight frames of printing film consumed in the test the modulator wheels will complete one revolution, the regulator wheel will complete one-third of a revolution and the switching cams will complete one-sixth of a revolution. Hence, the modulator wheels complete one revolution during the starting and stopping period and apertures A1 will move into the paths of the colored beams when the first image 296 of each test is recorded. Similarly, during the starting and stopping period aperture 214 in regulator wheel 202 will rotate through the path of beam 24 and the left-hand portion of aperture 210 will move into the beam path when frame 296 is recorded.

To facilitate an understanding of the operation of the scenetester each of cams 266, 268, 270 and 272, as shown in FIG. 7 have been divided into six equal sectors, designated C1–C5 and one sector having an arrow therein. One color "ring" of images will be recorded as each of cam sectors C1–C5 rotate past the cooperating microswitches. The sectors of the cams having arrows therein, which indicate the direction of rotation of the cams, will move past the microswitches during the starting and stopping period for each test.

A graphic indication of the color balance and density distribution of the images recorded during the normal range test is illustrated in FIG. 9. Frame 296 is shown as the central point of first color "ring" 304, and the six color balance variants comprising the "ring" are labeled A2–A7 corresponding to the color balance variants shown in Table I. Color "rings" 299, 301, 303 and 305 are shown in that order below "ring" 304 indicating the decreasing intensity of beam 24 for each of these "rings."

After the test has been completed and printing film 78 developed, an operator, by examining the strip of test images produced, may determine the most desirable print color balance and density for the entire scene from which film 38 comprises one negative frame. After selecting the test image having the most desirable print characteristics, the operator may adjust the exposure controls of a commercial additive color printer accordingly so that when the scene is printed the resulting print will possess the desired characteristics.

As will be apparent, there is a direct correlation in "light" units between the color balance and density of the test images and the exposure control scales of the printer. Therefore, adjustment of the printer exposure controls does not require gross empirical guesswork but merely adjustment in accordance with the value of the "light" units represented by a single frame of the test; the maximum interpolation required being between the four "light" color balance and intensity points represented by the test images.

The extended range color balance test

The basic operation of scenetester 10 for producing the extended range color balance test is the same as that employed for producing the normal range test. The modulator wheels, regulator wheel, switching cams 266, 268 and 272, and dowser unit all function identically in both tests. Also, the number of test images recorded, thirty-five, is exactly the same, comprising five color "rings" of seven images each.

The primary difference between the tests is that in the extended range test filter-actuator units 182, 184, 186 and 188 are employed to further modulate colored beams 18, 20 and 22. Also, for the extended range test, filter-actuator unit 226 is disabled and unit 222 enabled so that an ND.10 filter will be employed in combination with regulator wheel 202 to regulate the intensity of beam 24 instead of the ND.30 filter carried by unit 226.

The center points of the color "rings" produced in the extended range test are indicated in Table IV below in "light" units.

TABLE IV

| Color "Ring" No.: | Center point |
|---|---|
| 1 | −8 Red |
| 2 | −4 Red, −8 Green |
| 3 | Normal |
| 4 | +8 Red |
| 5 | −4 Red, −8 Blue |

These center points are achieved by interposing filter-actuator units 182, 184, 186 and 188 in the paths of the colored beams. The units are moved into and out of the beam paths while the blank transition frames between the "rings" are exposed at aperture 80. The solenoids of the units are energized at the proper times by switching cams 276 and cooperating microswitches. The values of the neutral density filters carried by the units are indicated in Table V below.

TABLE V

| Unit 182: | ND.10=−4 "lights" |
|---|---|
| Unit 184: | ND.20=−8 "lights" |
| Unit 186: | ND.20=−8 "lights" |
| Unit 188: | ND.20=−8 "lights" |

The sequence of actuation of the solenoids of units 182, 184, 186 and 188 is shown below in Table VI in terms of the filter values required to produce the desired color "ring" center points.

TABLE VI

| Color "Ring" No. | Center point | Sequence of interposing neutral density filters in colored beam paths | | |
|---|---|---|---|---|
| | | Red | green | Blue |
| 1 | −8 Red | ND.20 | | |
| 2 | −4 Red, −8 Green | ND.10 | ND.20 | |
| 3 | Normal | | | |
| 4 | +8 Red (=−8 Green, −8 Blue) | | ND.20 | ND.20 |
| 5 | −4 Red, −8 Blue | ND.10 | | ND.20 |

All of the color "rings" of the extended range test are recorded at an intensity level produced by interposing an ND.10 filter in the path of recombined beam 24, with the exception of the third or center "ring" which is recorded at the intensity level produced by interposing an ND.20 filter in the recombined beam path. To achieve this result, the ND.10 filter carried by unit 222 is positioned in the path of beam 24 while open aperture 210 in wheel 202 is moving through the beam; the filter-actuator unit being de-energized when apertures 212 and 214 move into the beam path. The intensity regulation sequence produced by wheel 202 and unit 222 is shown below in Table VII in terms of the filter values interposed in the path of beam 24.

TABLE VII

| Color "Ring" No. | Regulator wheel | Unit 222 |
|---|---|---|
| 1 | ND0.0 (aperture 210) | ND.10 |
| 2 | ND.10 (aperture 212, filter 218) | |
| 3 | ND.20 (aperture 214, filter 220) | |
| 4 | ND0.0 (aperture 210) | ND.10 |
| 5 | ND.10 (aperture 212, filter 218) | |

Figure 10:
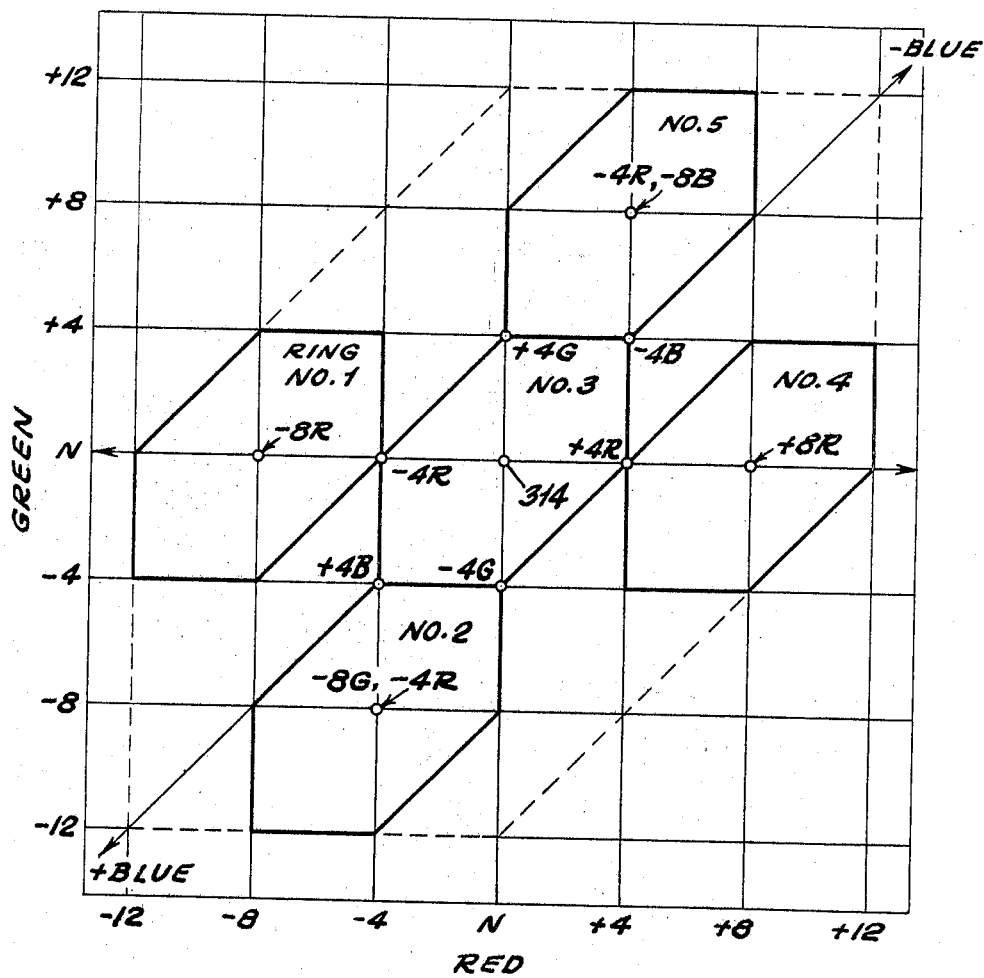
FIG. 10 is a graphic illustration of the color balance distribution of the test images produced by the scenetester shown in FIG. 1 when operated in an extended range color balance test mode.

The color balance distribution of the test images produced in the extended range test is shown in FIG. 10. The recordation sequence of the "rings" is indicated on the graph corresponding to the sequence of their center points as shown in Table IV. As will be apparent from an examination of FIG. 10, the extended range test includes every point on the four "light ring" and eight "light ring" circles about the equal or normal color balance image, designated as 314. For convenience, frame 314 also is identified in FIG. 8, indicating its position in relation to the other images recorded in the extended range test. The extended range test additionally includes ten of the eighteen points on the twelve "light ring" circle about normal color balance image 314.

The extended range test is used for testing duplicate negatives or a scene photographed under unusual lighting conditions, for which the color balance distribution of the normal range test is inadequate.

The coding means

To facilitate the identification of the most desirable print color balance and density values produced by a test, means are provided for coding the strip of test images in sound track area 315 of printing film 78. The coding means comprises a rotatably mounted disc 316 having an appropriate symbols inscribed on a transparent member carried at the periphery of the disc. The disc is positioned in the path of beam 24 so that the portion of the beam passing through the member will impinge on sound track area 315.

Conveniently, the transparent member will have five symbols inscribed thereon corresponding to the five intensity levels of beam 24 produced by regulator wheel 202 and filter-actuator unit 226 during each normal range test. The symbols may comprise numbers and appropriate signs indicating the values of the neutral density filters, in "light" units interposed in the printing beam. For example, the symbol "+8" may be illuminated when open aperture 210 is positioned in the beam path; "+4" when the ND.10 filter 218 carried by aperture 212 is positioned in the beam path; "0" or "N" when the ND.20 filter 220 carried by aperture 214 is positioned in the beam path; "−4" when the ND.30 filter carried by unit 226 and open aperture 210 are positioned in the beam path; and "−8" when the ND.30 and ND.10 filters carried by unit 226 and aperture 212, respectively, are positioned in the beam path.

The coding disc preferably is driven by a stepping motor in synchronism with the rotation of regulator wheel 202 and the other driven elements of the scenetester so that it will abruptly turn one-sixth of a revolution during the exposure of the transition frames between color "rings."

If desired, a more elaborate coding means may be employed such as a rotating prism projection device which codes each of the thirty-five frames of the test with both color balance and intensity data. Normally, however, such a device is unnecessary and merely adds to the cost of the apparatus. Conveniently, the color balance of the frames and their equivalent printer aperture systems programming may be identified by a reference chart, or reference film appropriately labeled.

The indicating means

Scenetester 10 also includes means for indicating whether the modulator wheels are rotating in synchronism with each other and whether the wheels are rotating in synchronism with the movement of the shutter of camera 76. The indicating means comprises an apertured wheel 318, shown in FIG. 6, having seven apertures 320 therein corresponding to apertures 106 in the modulator wheels. As will be noted in FIG. 6, the spacing of apertures 320 in wheel 318 is identical to the spacing of apertures 106 in the modulator wheels.

Wheel 318 is affixed to a shaft 322 which is rotatably supported in bearing blocks, one of which is designated by the numeral 324 in FIG. 1. Shaft 322 is connected to camera drive shaft 288 as indicated schematically in FIG. 1 so that wheel 318 will rotate in synchronism with the movement of the shutter of camera 76.

A portion of beam 26, designated as indicating beam 328 and which would not otherwise enter aperture 80, is reflected toward wheel 318 by a small mirror 326. Mirror 326 directs beam 328 into an objective 330 which relays the beam toward wheel 318. The wheel is positioned so that apertures 320 therein will move through the path of beam 328 as the wheel is rotated. A cover 332 having a translucent window 334 therein is placed over wheel 318; window 334 being aligned with beam 328.

When the scenetester is operating properly and the modulator wheels are rotating in synchronism with each other and the movement of the camera shutter, one of apertures 320 will rotate into the path of beam 328 simultaneously with the movement of one set of corresponding apertures 106 in the modulator wheels into the path of the colored beams. Thus, an operator viewing the image produced by beam 328 at window 334 will see a white light which flashes in correspondence with the sequential movement of apertures A1–A7 through the colored beam paths.

If the modulator wheels are out of synchronism with each other, the image produced at window 334 will be of some color other than white indicating that the corresponding apertures in the modulator wheels are not simultaneously rotating into the paths of the colored beams. If the intensity of the image at window 334 becomes fainter but remains white, the operator will know that the modulator wheels are operating in synchronism with each other but not in synchronism with the movement of the camera shutter. Finally, if the image at window 334 becomes both fainter and changes color the operator will be apprised that the modulator wheels are rotating out of synchronism with each other and with the movement of the camera shutter.

As will be evident from the foregoing description, the apparatus of the invention constitutes an extremely useful means for producing a scenetest of a scene recorded on motion picture film. Similarly, the process embodied by the scenetester constitutes an efficient method for determining the most desirable print color balance and density for a scene. Due to the direct correlation between the test images produced and the exposure control scales of commercial additive color printers, adjustment of the printer control presents no problem of gross empirical guesswork as was necessary with the tests produced by the prior art scenetesters. Thus, substantial savings in time and printing film are made possible by the apparatus and process of the invention.

Many modifications of the preferred embodiment of the invention described above will occur to those skilled in the art. For example, means could be provided for varying the sizes of apertures 106 in the modulator wheels and additional neutral density filters might be employed for further modifying the color balance or itensity distribution of the printing beam. Other means of modulating the colored light beams also might be employed, such as servo-operated apertures or mirrors, or continuously or intermittently moving bands of film with apertures and "mattes." Moreover, the filters carried by the filter actuator units might be moved into, or out of, the colored light beams by other means, such as by linear motion solenoids or by servo motors. Also, various different mechanically equivalent structures might be employed for the adjustable light beam trimmers, or various neutral density filter arrangements might be substituted for the mechanically operated filters having variable sized openings. Therefore, the invention is so limited solely by the scope of the appended claims.

I claim:
1. An apparatus comprising:
   a source of white light for generating a white light beam;
   means for splitting the white beam into individual red, green, and blue colored light beams and recombining the colored beams into a white light beam;
   means for modulating the individual amounts of red, green, and blue colored light present in the recombined white beam for regulating the color balance of said recombined beam;
   means for operating said modulating means and changing the color balance of said recombined beam in a predetermined sequence;
   means for regulating the intensity of the recombined beam;
   means for illuminating a translucent film with the recombined beam after the color balance and intensity thereof have been regulated; and
   means for photographically recording an image of said film as illuminated by the recombined beam, said recording means being connected to said operating means so that each time the color balance of said recombined beam is changed an image of said film is recorded, whereby the color balance and density of each image is dependent upon the color balance and intensity of the recombined beam.
2. An apparatus according to claim 1, wherein said beam splitting and recombining means comprises a dichroic mirror system.
3. An apparatus according to claim 1, wherein said recording means comprises a camera.
4. An apparatus according to claim 1, wherein said modulating means comprises a plurality of rotatably mounted wheels positioned in the paths of said colored light beams, said wheels having a plurality of different sized apertures therein through which said colored beams pass as said apertures are rotated sequentially into and out of the paths of said beams; and said operating means comprises drive means for synchronously rotating said wheels.
5. An apparatus according to claim 4, wherein said modulating means further comprises a plurality of light filters which may be interposed selectively in the paths of said colored light beams.
6. An apparatus according to claim 5, wherein at least one of said filters is carried by an actuator which when energized automatically interposes the filter carried thereby in the path of one of said colored beams; and said operating means includes means for energizing said actuator in synchronism with the rotation of said wheels.
7. An apparatus according to claim 6, wherein said actuator comprises a rotary solenoid; and said energizing means comprises a switch operatively connected to said solenoid and a rotary cam operatively connected to said drive means for actuating said switch in a predetermined sequence.
8. An apparatus according to claim 6, wherein at least one said actuator-carried filter is associated with each of said colored beams.
9. An apparatus according to claim 4, wherein said modulating means further comprises a plurality of adjustable light beam trimmers positioned in the paths of said colored beams and means for adjusting said trimmers.
10. An apparatus according to claim 9, wherein one of said trimmers is positioned in the path of each of said colored beams.
11. An apparatus according to claim 9, wherein each of said trimmers comprises a pair of pivotally mounted blades which define therebetween a variable-sized opening through which one of said colored beams passes; and said adjusting means is operatively connected to said blades for varying the size of the opening defined thereby.
12. An apparatus according to claim 9, wherein each of said trimmers comprises:
   a supporting member attached to said apparatus;
   upper and lower substantially horizontally disposed trimmer blades pivotally connected to said supporting member, said blades being substantially vertically aligned with each other to define therebetween a variable-sized opening through which one of said colored beams passes, and said upper blade is connected to said adjusting means;
   a substantially vertically disposed leg integrally affixed to each of said blades, the leg affixed to said upper blade extending downwardly and the leg affixed to said lower blade extending upwardly, said downwardly extending leg having a portion which horizontally overlaps a portion of said upwardly extending leg, and the overlapping portion of said downwardly extending leg is positioned adjacent the overlapped portion of said upwardly extending leg and between said overlapped portion and the opening defined by the blades; and
   a resilient bearing affixed to the overlapping portion of said downwardly extending leg and abutted by the overlapped portion of said upwardly extending leg, whereby when the upper blade and downwardly extending leg affixed thereto are moved by said adjusting means, the gravitational force acting on the lower blade causes the upwardly extending leg affixed thereto to continue to abut the bearing, so that the lower blade will be moved in a direction opposite to the direction of movement of the upper blade.
13. An apparatus according to claim 1, further comprising indicating means operatively connected to said recording means for indicating whether said images are being recorded in synchronism with the changes in color balance of said recombined beam.
14. An apparatus according to claim 1, wherein said regulating means includes means for changing the intensity of said recombined beam in a predetermined sequence.
15. An apparatus according to claim 14, wherein said regulating means is connected to said operating means so that the color balance and intensity of said recombined beam are changed in synchronism.
16. An apparatus according to claim 14, wherein said regulating means comprises, a rotatably mounted wheel having a plurality of apertures therein through which said recombined beam passes; and said operating means comprises drive means for rotating said wheel.
17. An apparatus according to claim 16, wherein at least one of said aperatures has a light filter mounted therein.
18. An apparatus according to claim 16, wherein said regulating means further comprises at least one light filter which may be interposed selectively in the path of said recombined beam.
19. An apparatus according to claim 18, wherein said filter is carried by an actuator which when energized automatically interposes said filter in the path of said recombined beam; and said operating means includes means for energizing said actuator in synchronism with the rotation of said wheel.
20. An apparatus according to claim 19, wherein said actuator comprises a rotary solenoid; and said energizing means comprises a switch operatively connected to said solenoid and a rotary cam operatively connected to said drive means for actuating said switch in a predetermined sequence.
21. An apparatus according to claim 1, further com- prising an opaque flag which may be interposed selectively in the path of said recombined beam between said film and said recording means to prevent the recording means from photographically recording extraneous images.

22. An apparatus according to claim 21, wherein said flag is carried by an actuator which when energized automatically removes said flag from the path of said recombined beam; and said operating means includes means for energizing said actuator.

23. An apparatus according to claim 22, wherein said actuator comprises a rotary solenoid; and said energizing means comprises a switch operatively connected to said solenoid, a rotary cam for actuating said switch, and a drive means for rotating said cam so that the cam actuates the switch in a predetermined sequence.

24. An apparatus according to claim 1, further comprising means for coding the images of said film to indicate the intensity of said recombined beam at the time the images are recorded.

25. A process for photographically recording a plurality of images of a translucent film wherein the color balance of said images varies from image-to-image in a predetermined sequence, comprising:
  splitting a white light beam into individual, red, green and blue colored light beams;
  modulating each of said colored beams in a predetermined sequence;
  recombining said colored beams into a white light beam, the color balance of said recombined beam being changed in correspondence to the modulations of said colored beams;
  regulating the intensity of said recombined beam;
  illuminating said translucent film with said recombined beam after the intensity thereof has been regulated; and
  photographically recording an image of said film each time the color balance of said recombined beam is changed, whereby a plurality of images are produced having image-to-image variations in color balance corresponding to the modulations of said colored beams and a density corresponding to the intensity of said recombined beam.

26. A process according to claim 25, wherein the intensity of said recombined beam is changed in a predetermined sequence in synchronism with the modulations of said colored beams.

References Cited

UNITED STATES PATENTS

| | | | |
|---|---|---|---|
| 2,909,097 | 10/1959 | Alden et al. | 353—31 |
| 3,238,841 | 3/1966 | Bjelland et al. | 355—35 |
| 3,322,025 | 5/1967 | Dauser | 355—35 |

NORTON ANSHER, Primary Examiner

W. A. SIVERTSON, Assistant Examiner

U.S. Cl. X.R.

335—77